(12) United States Patent
Hu et al.

(10) Patent No.: US 12,104,510 B2
(45) Date of Patent: Oct. 1, 2024

(54) METHOD FOR DETECTING UREA CONSUMPTION DEVIATION, AND VEHICLE POST-PROCESSING SYSTEM

(71) Applicant: WEICHAI POWER CO., LTD., Shandong (CN)

(72) Inventors: Jinjin Hu, Shandong (CN); Xianfeng Ren, Shandong (CN); Yupeng Wang, Shandong (CN); Libing Yan, Shandong (CN); Dong Qiu, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 168 days.

(21) Appl. No.: 18/009,101

(22) PCT Filed: Dec. 31, 2019

(86) PCT No.: PCT/CN2019/130589
§ 371 (c)(1),
(2) Date: Dec. 8, 2022

(87) PCT Pub. No.: WO2021/134504
PCT Pub. Date: Jul. 8, 2021

(65) Prior Publication Data
US 2023/0349312 A1 Nov. 2, 2023

(51) Int. Cl.
*F01N 11/00* (2006.01)
*F01N 3/10* (2006.01)
*F01N 3/20* (2006.01)

(52) U.S. Cl.
CPC ........... *F01N 11/002* (2013.01); *F01N 3/106* (2013.01); *F01N 3/208* (2013.01); *F01N 3/20* (2013.01);
(Continued)

(58) Field of Classification Search
CPC ........ F01N 11/002; F01N 3/106; F01N 3/208; F01N 3/20; F01N 11/00; F01N 2550/05;
(Continued)

(56) References Cited

U.S. PATENT DOCUMENTS

2012/0067031 A1\* 3/2012 Wang ...................... F01N 11/00
60/277
2012/0286063 A1\* 11/2012 Wang ...................... F01N 3/208
73/114.51

FOREIGN PATENT DOCUMENTS

CN 104008691 A \* 8/2014
CN 109944666 A \* 6/2019
(Continued)

OTHER PUBLICATIONS

English Machine Translation of DE102013216894A1 translated by USPTO Fit Database. (Year: 2015).\*
(Continued)

*Primary Examiner* — Dominick L Plakkoottam
*Assistant Examiner* — Paul W Thiede
(74) *Attorney, Agent, or Firm* — Scully, Scott, Murphy & Presser, P.C.

(57) ABSTRACT

A method for detecting a urea consumption deviation including: calculating a pump pressure correction factor fac; calculating a urea consumption deviation factor A when the pump pressure correction factor fac is within a calibrated range; calculating the urea consumption deviation factor A multiple times, and calculating an average value of A; and comparing the average value of the urea consumption deviation factor A with a calibrated limiting value range, so as to determine whether there is a great deviation between an actual urea consumption value and a theoretical urea consumption value, the calculating the pump pressure correction factor fac comprises: adjusting a pressure of a urea pump to P1; adjusting the pressure of the urea pump to P2,
(Continued)

where P2 is smaller than P1; recording a time T1 during which the pressure of the urea pump is adjusted from P1 to P2; and calculating fac=T1/(P1−P2).

9 Claims, 3 Drawing Sheets

(52) U.S. Cl.
CPC ............. *F01N 3/2066* (2013.01); *F01N 11/00* (2013.01); *F01N 2550/05* (2013.01); *F01N 2610/02* (2013.01); *F01N 2610/1406* (2013.01); *F01N 2610/144* (2013.01); *F01N 2610/148* (2013.01); *F01N 2900/1602* (2013.01); *F01N 2900/1622* (2013.01); *F01N 2900/1808* (2013.01); *F01N 2900/1812* (2013.01); *F01N 2900/1822* (2013.01); *Y02A 50/20* (2018.01); *Y02T 10/40* (2013.01)

(58) Field of Classification Search
CPC ......... F01N 2610/02; F01N 2610/1406; F01N 2610/144; F01N 2610/148; F01N 2900/1602; F01N 2900/1622; F01N 2900/1808; F01N 2900/1812; F01N 2900/1822; F01N 3/2066; Y02A 50/20; Y02T 10/40

See application file for complete search history.

(56) References Cited

FOREIGN PATENT DOCUMENTS

| | | | | |
|---|---|---|---|---|
| DE | 102006032399 A1 | * | 1/2008 | ............. B01D 53/90 |
| DE | 102012218092 A1 | * | 4/2014 | ............. F01N 11/00 |
| DE | 102013216894 A1 | * | 2/2015 | ............. F01N 11/00 |
| DE | 102018104051 A1 | * | 8/2018 | ............. F01N 11/00 |

OTHER PUBLICATIONS

English Machine Translation of DE102018104051A1 translated by USPTO Fit Database. (Year: 2018).*

* cited by examiner

METHOD FOR DETECTING UREA CONSUMPTION DEVIATION, AND VEHICLE POST-PROCESSING SYSTEM

TECHNICAL FIELD

The present disclosure belongs to the technical field of vehicle detection, and in particular relates to a method for detecting urea consumption deviation and a vehicle after-treatment system.

BACKGROUND

This section only provides background information related to the present disclosure, which is not necessarily the prior art. Vehicle urea is used in a vehicle after-treatment system, in which a urea aqueous solution is injected from a urea nozzle into a vehicle exhaust passage, and the urea is hydrolyzed by using the heat of exhaust gas to generate ammonia. Ammonia is used as a reducing agent of Selective Catalytic Reduction (SCR) device to decrease nitrogen oxides in the exhaust gas of diesel-powered vehicles. At present, a change of liquid level of a urea tank is commonly used to diagnose a deviation between an actual consumption amount and a theoretical consumption amount of urea. However, due to the different shapes of the urea tanks from various manufacturers, it is necessary to calibrate the liquid level of urea and sensor voltage conversion respectively for the urea tanks of different shapes, which is of poor versatility.

SUMMARY

An object of the present disclosure is to at least solve the problem of diagnosing the deviation between the actual consumption amount and the theoretical consumption amount of urea according to the change of liquid level of the urea tank, and this object is achieved through the following technical solutions.

A first aspect of the present disclosure proposes a method for detecting urea consumption deviation, which includes the following steps:
calculating a pump pressure correction factor fac;
calculating a urea consumption deviation factor A when the pump pressure correction factor fac is within a calibrated range, and accumulating the times of calculation;
calculating the urea consumption deviation factor A for multiple times, and calculating an average value of A; and
comparing the average value of the urea consumption deviation factor A with a calibrated limit value range, so as to judge whether there is a large deviation between an actual urea consumption value and a theoretical urea consumption value.

According to the method of the present disclosure for detecting urea consumption deviation, whether the urea nozzle is blocked or an orifice is enlarged is judged according to the change of pump pressure, and considering correction conditions of characteristics of the urea injection system itself to the pressure of the urea pump, the urea consumption deviation factor A is corrected by calculating the pump pressure correction factor fac; according to the average value of the urea consumption deviation factor A after multiple times of calculation, it is judged whether there is a large deviation between the actual consumption amount and the theoretical consumption amount of urea.

In addition, the method for detecting urea consumption deviation according to the present disclosure may also include the following additional technical features:
the calculating the pump pressure correction factor fac includes the following steps:
adjusting a pressure of a urea pump to P1;
adjusting the pressure of the urea pump to P2 after the pressure of the urea pump is stabilized, where P2 is smaller than P1;
recording a time T1 during which the pressure of the urea pump is adjusted from P1 to P2; and calculating fac=$T1/(P1-P2)$.

In some embodiments of the present disclosure, the pressure of the urea pump is switched from P1 to P2 by adjusting a pump driving duty cycle of the urea pump.

In some embodiments of the present disclosure, the pump driving duty cycle when the pressure of the urea pump is adjusted to P1 is larger than the pump driving duty cycle when the pressure of the urea pump is adjusted to P2.

In some embodiments of the present disclosure, a nozzle of the urea pump remains closed during the processes of adjusting the pressure of the urea pump to P1 and adjusting the pressure of the urea pump to P2.

In some embodiments of the present disclosure, the process of calculating the average value of the urea consumption deviation factor A includes the following steps:
adjusting a pressure of a urea pump to P3;
closing a nozzle of the urea pump after the nozzle is opened for a time T2, after the pressure of the pump is stabilized, and recording a minimum pressure P4 during the opening process of the nozzle; and
calculating the urea consumption deviation factor $$A = fac \cdot \frac{P3 - P4}{T2},$$

repeating the calculation of A for N times, and calculating an average value of A of the N times of calculation;
where P3 is a set pressure in an injection test, P4 is a minimum pressure in an opening stage of the nozzle during the injection test, and T2 is the opening time of the nozzle.

In some embodiments of the present disclosure, in the process of calculating the urea consumption deviation factor A, a pump driving duty cycle of the urea pump remains unchanged.

Another aspect of the present disclosure also proposes a vehicle after-treatment system, which is configured to implement the method for detecting urea consumption deviation according to any of the above items, and which includes a DOC, a DPF and a SCR that are arranged in an exhaust pipe of an engine and connected in sequence in a direction of exhaust gas flow, as well as a urea tank communicating with an inlet end of the SCR.

In some embodiments of the present disclosure, the vehicle after-treatment system further includes a DOC upstream temperature sensor and a DOC downstream temperature sensor, and the DOC upstream temperature sensor, the DOC and the DOC downstream temperature sensor are arranged in sequence in the direction of the exhaust gas flow.

In some embodiments of the present disclosure, the vehicle after-treatment system further includes a urea pump and a nozzle; the urea pump is configured to lead out urea in the urea tank, and the urea is injected into the inlet end of the SCR through the nozzle.

BRIEF DESCRIPTION OF THE DRAWINGS

Upon reading the detailed description of preferred embodiments below, various other advantages and benefits will become clear to those skilled in the art. The accompanying drawings are only used for the purpose of illustrating the preferred embodiments, and should not be considered as a limitation to the present disclosure. Moreover, throughout the drawings, identical parts are denoted by identical reference signs. In the drawings.

REFERENCE SIGNS USED IN THE DRAWINGS ARE LISTED AS FOLLOWS

Figure 1:
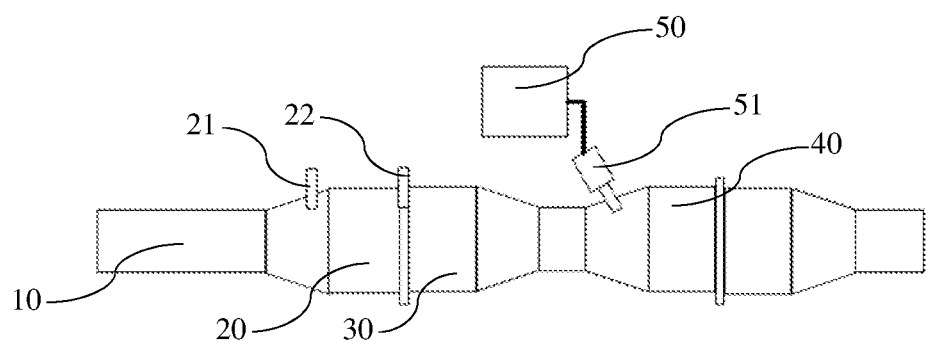
FIG. 1 is a schematic structural view of a vehicle after-treatment system in an embodiment of the present disclosure.

10: exhaust pipe;
20: DOC; 21: DOC upstream temperature sensor; 22: DOC downstream temperature sensor;
30: DPF;
40: SCR;
50: urea pump; 51: nozzle;
60: urea tank.

DETAILED DESCRIPTION

Hereinafter, exemplary embodiments of the present disclosure will be described in greater detail with reference to the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

It should be understood that the terms used herein are only for the purpose of describing specific exemplary embodiments, and are not intended to be limitative. Unless clearly indicated otherwise in the context, singular forms "a", "an", and "said" as used herein may also mean that plural forms are included. Terms "include", "comprise", "contain" and "have" are inclusive, and therefore indicate the existence of the cited features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms "first", "second", "third" and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as "first", "second" and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, "inner", "outer", "inside", "outside", "below", "under", "on", "above", etc. These spatial relative terms are intended to include different orientations of the device in use or in operation in addition to the orientation depicted in the drawings. For example, if the device in a figure is turned over, then elements described as "below other elements or features" or "under other elements or features" will be oriented as "on the other elements or features" or "above the other elements or features". Thus, the exemplary term "below" may include orientations of both above and below. The device can be otherwise oriented (rotated by 90 degrees or in other directions), and the spatial relationship descriptors used herein will be explained accordingly.

Figure 2:
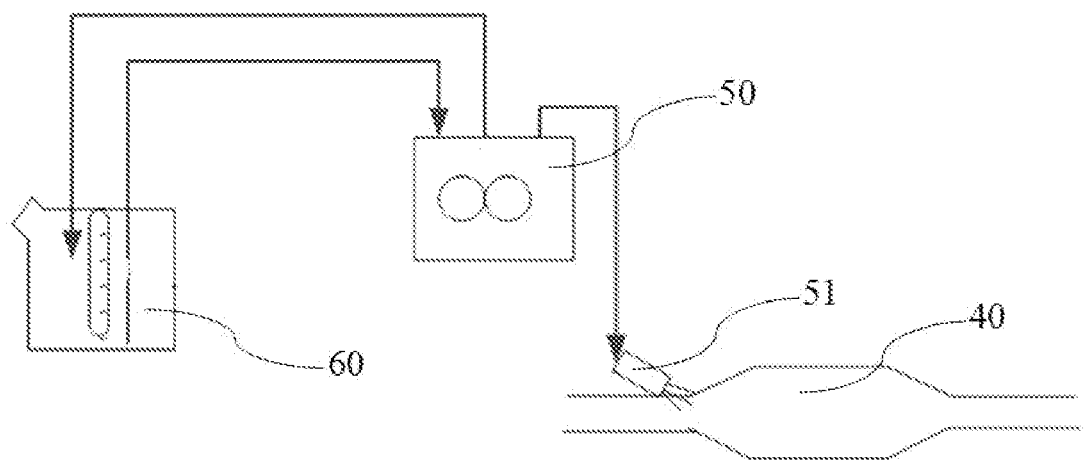
FIG. 2 is a schematic view showing a connection structure between a urea tank and a SCR in the embodiment of the present disclosure.

Another aspect of the present disclosure also proposes a vehicle after-treatment system, and FIG. 1 is a schematic structural view of the vehicle after-treatment system in an embodiment of the present disclosure. As shown in FIG. 1, the vehicle after-treatment system in this embodiment includes a DOC 20 (a diesel oxidation catalyst, which can oxidize NO in the exhaust gas into NO2), a DPF 30 (a diesel particle trap, which can capture particles by alternately blocking inlets and outlets of carrier holes to force a gas flow through a porous wall face) and a SCR 40 (a selective catalytic oxidation device, which injects urea in front of a SCR tank to generate NH3 to react with NOx in the exhaust gas, so as to remove NOx) that are arranged in sequence in an exhaust pipe 10 of a vehicle engine; a DOC upstream temperature sensor 21 and a DOC downstream temperature sensor 22 are respectively provided at an upstream position and a downstream position of a gas flow in the DOC 20, so as to monitor upstream and downstream temperatures of the DOC 20 in real time and ensure a reaction temperature in the DOC 20. FIG. 2 is a schematic view showing a connection structure between a urea tank and the SCR in the embodiment of the present disclosure. A nozzle 51 of a urea pump 50 communicating with an interior of the exhaust pipe 10 is provided at an upstream position of the SCR 40. The urea pump 50 draws urea from a urea tank 60, and then injects the urea into the exhaust pipe 10 through the nozzle 51 after pressurization, so as to decrease NOx. A pressure of the urea pump 50A is determined by a value of driving duty cycle of the urea pump 50, that is, the larger the driving duty cycle of the pump is, the faster a rotational speed of the urea pump 50 will be, and the larger the pressure of the urea pump 50 will be. The nozzle 51 is an electronic metering valve and the nozzle 51 is controlled to be opened or closed through a control signal.

Figure 3:
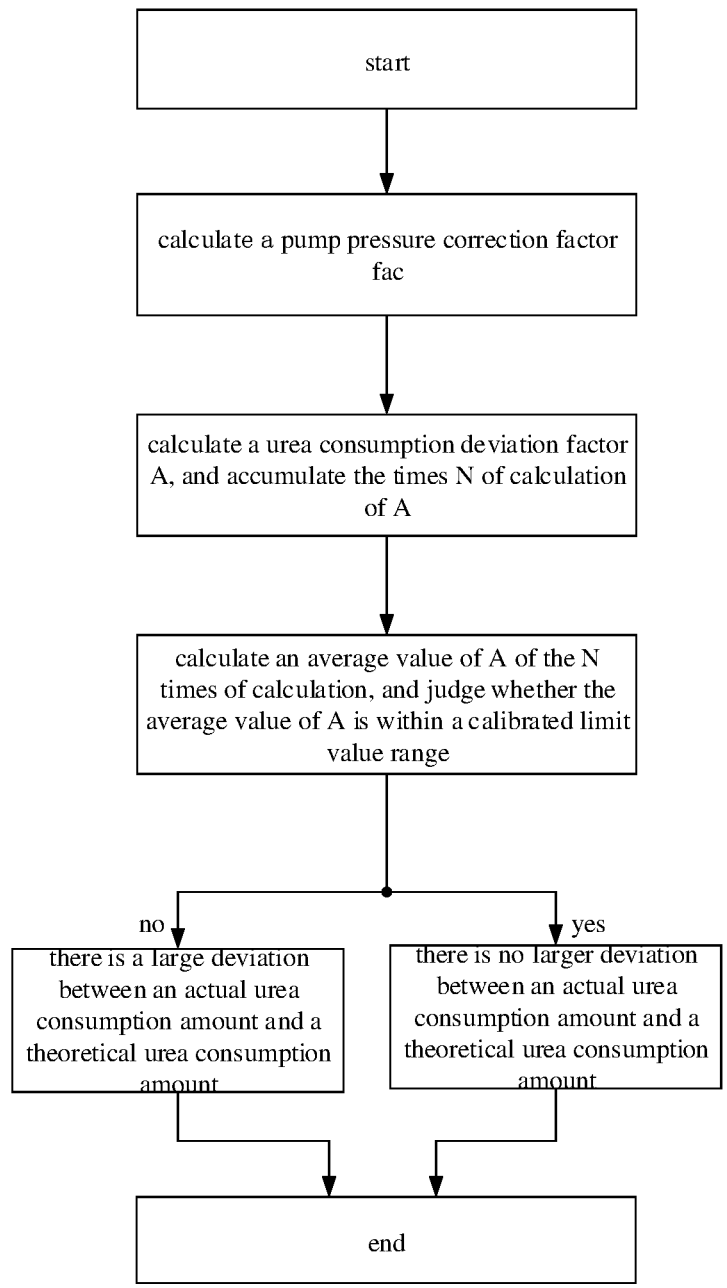
FIG. 3 is a flowchart of a method for detecting urea consumption deviation according to an embodiment of the present disclosure.

FIG. 3 is a flowchart of a method for detecting urea consumption deviation according to an embodiment of the present disclosure. The urea consumption deviation is detected according to the vehicle after-treatment system in FIG. 1. As shown in FIG. 3, the method for detecting urea consumption deviation in this embodiment includes the following steps:

calculating a pump pressure correction factor fac;

calculating a urea consumption deviation factor A when the pump pressure correction factor fac is within a calibrated range, and accumulating the times of calculation;

calculating the urea consumption deviation factor A for multiple times, and calculating an average value of A; and comparing the average value of the urea consumption deviation factor A with a calibrated limit value range, so as to judge whether there is a large deviation between an actual urea consumption value and a theoretical urea consumption value.

According to the method of the present disclosure for detecting urea consumption deviation, whether the nozzle is blocked or an orifice is enlarged is judged according to the change of the pressure of the urea pump, and considering correction conditions of characteristics of the urea injection system itself to the pressure of the urea pump, the pump pressure correction factor fac is calculated, and further the average value of the urea consumption deviation factor A is corrected; according to the average value of the corrected urea consumption deviation factor A, it is judged whether there is a large deviation between the actual consumption amount and the theoretical consumption amount of urea.

When the pump pressure is stable, the urea nozzle is opened, the pump pressure drops slowly, and maximum and minimum values during the change of the pressure of the urea pump are recorded; the urea consumption deviation factor A is calculated according to the maximum and minimum values. At the same time, considering the difference of pump pressure change itself between different pumps in the event of not opening the nozzle, the pump pressure correction factor fac needs to be multiplied when calculating the average value of A. Only when the pump pressure correction factor is within a reasonable range will the finally calculated average value of the urea deviation consumption factor A be meaningful.

The calculating the pump pressure correction factor fac includes the following steps:

adjusting the pressure of the urea pump to P1;

adjusting the pressure of the urea pump to P2 after the pressure of the urea pump is stabilized, where P2 is smaller than P1;

recording a time T1 during which the pressure of the urea pump is adjusted from P1 to P2; and calculating fac=$T1/(P1-P2)$.

In the processes of adjusting the pressure of the urea pump to P1 and adjusting the pressure of the urea pump to P2, the nozzle of the urea pump remains closed, and the pressure of the urea pump is switched from P1 to P2 only by adjusting the pump driving duty cycle of the urea pump. Since the pressure of the urea pump is determined by the value of the driving duty cycle of the urea pump, the pump driving duty cycle when the pressure of the urea pump is adjusted to P1 is larger than the pump driving duty cycle when the pressure of the urea pump is adjusted to P2.

Since the change of pump pressure may also be different in the same injection system even if there is no nozzle failure, the calculation of the pump pressure correction factor is considered in this embodiment to prevent the change of pump pressure caused by the injection system itself and to ensure the accuracy of measurement.

When the pump pressure correction factor fac is within the calibrated range, the method proceeds to the next step. If the pump pressure correction factor fac is outside the calibrated range, the pump pressure correction factor fac needs to be calculated again. The calibrated range for fac needs to be calculated according to the pressure of the urea pump in normal operation.

Further, the process of calculating the average value of urea consumption deviation factor A includes the following steps:

adjusting the pressure of the urea pump to P3;

closing the nozzle of the urea pump after the nozzle is opened for a time T2, after the pressure of the pump is stabilized, and recording a minimum pressure P4 during the opening process of the nozzle; and calculating the urea consumption deviation factor $$A = fac \cdot \frac{P3 - P4}{T2},$$

repeating the calculation of A for N times, and calculating an average value of A of the N times of calculation;

where P3 is a set pressure in an injection test, P4 is a minimum pressure in an opening stage of the nozzle during the injection test, and T2 is the opening time of the nozzle.

During the process of closing the nozzle of the urea pump after the nozzle has been opened for the time T2, the pump driving duty cycle of the urea pump remains unchanged, and the pressure in the urea pump is reduced only through the injection of the nozzle. The time of T2 is about is, during which the nozzle only injects once, and the minimum pressure P4 in this injection process is determined.

The average value of the corrected urea consumption deviation factor A is compared with the calibrated limit value range, so as to judge whether there is a large deviation between the actual urea consumption value and the theoretical urea consumption value. When the average value of the urea consumption deviation factor A is within the calibrated limit value range, it is judged that there is no large deviation between the actual urea consumption value and the theoretical urea consumption value; and when the average value of the urea consumption deviation factor A is outside the calibrated limit value range, it is judged that there is a large deviation between the actual urea consumption value and the theoretical urea consumption value, and the nozzle of the urea pump is blocked or the orifice is enlarged. The calibrated limit value range of the urea consumption deviation factor A needs to be determined according to the pressure of the urea pump and urea nozzle in normal operation.

By using the method for detecting urea consumption deviation and the vehicle after-treatment system for implementing the detection method in the present application, under the same set pump pressure, it is judged whether the nozzle is blocked or the orifice is enlarged according to the different changes in the pressure of the urea pump, so as to further judge whether there is a large deviation between the actual consumption amount and the theoretical consumption amount of urea; therefore, it is not necessary to recalibrate the liquid level change of the urea tank according to the change of the shape of the urea tank, and the steps of detecting urea consumption deviation are simplified.

Described above are only specific preferred embodiments of the present application, but the scope of protection of the present application is not limited to this. Changes or substitutions that can be easily devised by those skilled in the art within the technical scope disclosed by the present application should be covered within the scope of protection of the present application. Therefore, the scope of protection of the present application shall be accorded with the scope of protection of the claims.

The invention claimed is:

1. A method for detecting urea consumption deviation, comprising the following steps:
   calculating a pump pressure correction factor fac;
   calculating a urea consumption deviation factor A when the pump pressure correction factor fac is within a calibrated range;
   calculating the urea consumption deviation factor A for multiple times, and calculating an average value of A; and
   comparing the average value of the urea consumption deviation factor A with a calibrated limit value range, so as to judge whether there is a predetermined deviation between an actual urea consumption value and a theoretical urea consumption value, wherein when the average value of the urea consumption deviation factor A is within the calibrated limit value range, it is judged that the predetermined deviation between the actual urea consumption value and the theoretical urea consumption value does not exist; and when the average value of the urea consumption deviation factor A is outside the calibrated limit value range, it is judged that the predetermined deviation between the actual urea consumption value and the theoretical urea consumption value exists; and
   wherein the calculating the pump pressure correction factor fac comprises the following steps:
   adjusting a pressure of a urea pump to P1;
   adjusting the pressure of the urea pump to P2, where P2 is smaller than P1;
   recording a time T1 during which the pressure of the urea pump is adjusted from P1 to P2; and
   calculating fac=T1/(P1−P2).

2. The method for detecting urea consumption deviation according to claim 1, wherein the pressure of the urea pump is switched from P1 to P2 by adjusting a pump driving duty cycle of the urea pump.

3. The method for detecting urea consumption deviation according to claim 2, wherein the pump driving duty cycle when the pressure of the urea pump is adjusted to P1 is larger than the pump driving duty cycle when the pressure of the urea pump is adjusted to P2.

4. The method for detecting urea consumption deviation according to claim 1, wherein a nozzle of the urea pump remains closed during the processes of adjusting the pressure of the urea pump to P1 and adjusting the pressure of the urea pump to P2.

5. The method for detecting urea consumption deviation according to claim 1, wherein the process of calculating the average value of the urea consumption deviation factor A comprises the following steps:
   adjusting a pressure of a urea pump to P3;
   closing a nozzle of the urea pump after the nozzle is opened for a time T2, and recording a minimum pressure P4 during the opening process of the nozzle; and
   calculating the urea consumption deviation factor $$A = fac \cdot \frac{P3 - P4}{T2},$$

repeating the calculation of A for N times, and calculating an average value of A of the N times of calculation;
   where P3 is a set pressure in an injection test, P4 is a minimum pressure in an opening stage of the nozzle during the injection test, and T2 is the opening time of the nozzle.

6. The method for detecting urea consumption deviation according to claim 5, wherein in the process of calculating the urea consumption deviation factor A, a pump driving duty cycle of the urea pump remains unchanged.

7. A vehicle after-treatment system, which is configured to implement the method for detecting urea consumption deviation according to claim 1, wherein the vehicle after-treatment system comprises a DOC, a DPF and a SCR that are arranged in an exhaust pipe of an engine and connected in sequence in a direction of exhaust gas flow, as well as a urea tank communicating with an inlet end of the SCR.

8. The vehicle after-treatment system according to claim 7, further comprising a DOC upstream temperature sensor and a DOC downstream temperature sensor, wherein the DOC upstream temperature sensor, the DOC and the DOC downstream temperature sensor are arranged in sequence in the direction of the exhaust gas flow.

9. The vehicle after-treatment system according to claim 7, further comprising a urea pump and a nozzle, wherein the urea pump is configured to lead out urea in the urea tank, and the urea is injected into the inlet end of the SCR through the nozzle.

* * * * *